No. 762,020. PATENTED JUNE 7, 1904.
J. T. BRATTIN & W. G. RESSLAND.
FINGER EXERCISER FOR STUDENTS OF TYPE WRITING.
APPLICATION FILED JAN. 27, 1904.
NO MODEL. 2 SHEETS—SHEET 1.
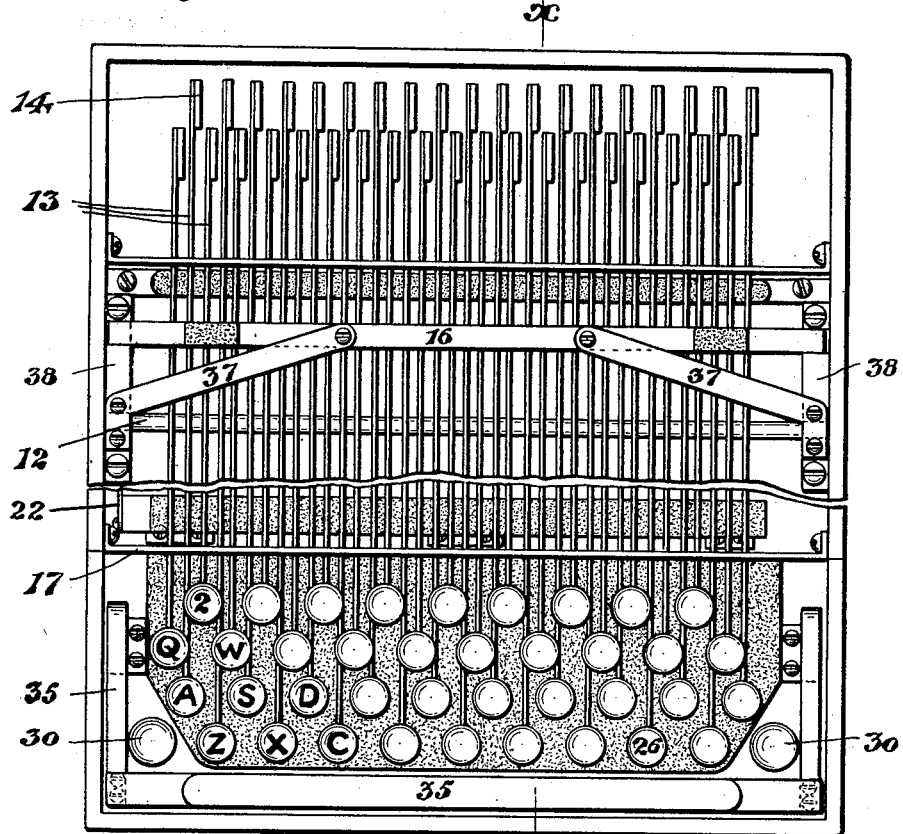
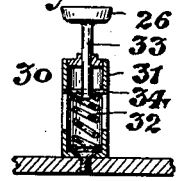
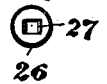
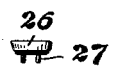
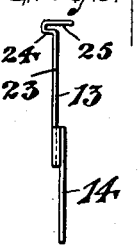
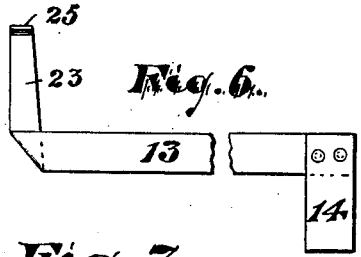
WITNESSES:
Ralph Lancaster
Russell M. Everett
INVENTORS
John T. Brattin,
William G. Ressland,
BY Charles H. Pell
ATTORNEY.

No. 762,020. PATENTED JUNE 7, 1904.
J. T. BRATTIN & W. G. RESSLAND.
FINGER EXERCISER FOR STUDENTS OF TYPE WRITING.
APPLICATION FILED JAN. 27, 1904.
NO MODEL. 2 SHEETS—SHEET 2.
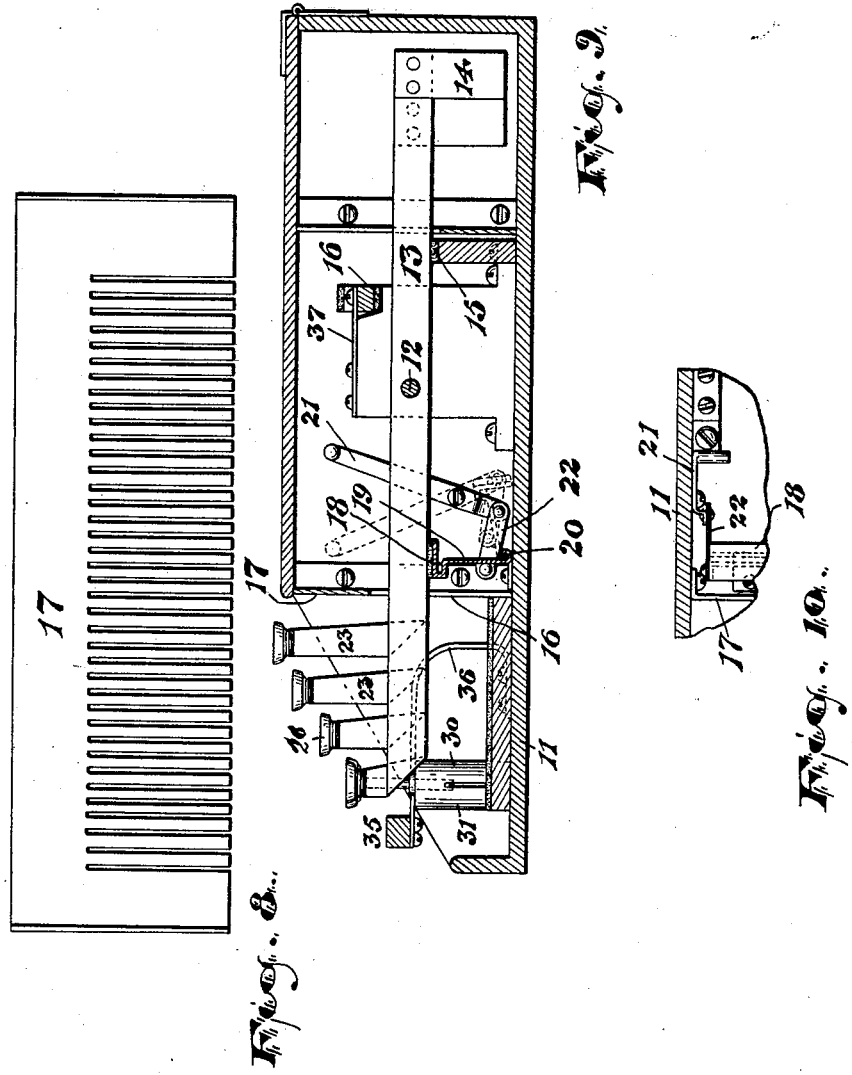

No. 762,020. Patented June 7, 1904.

UNITED STATES PATENT OFFICE.

JOHN T. BRATTIN, OF IRVINGTON, AND WILLIAM G. RESSLAND, OF NEWARK, NEW JERSEY.

FINGER-EXERCISER FOR STUDENTS OF TYPE-WRITING.

SPECIFICATION forming part of Letters Patent No. 762,020, dated June 7, 1904.

Application filed January 27, 1904. Serial No. 190,785. (No model.)

*To all whom it may concern:*

Be it known that we, JOHN T. BRATTIN, residing at Irvington, and WILLIAM G. RESSLAND, residing at Newark, in the county of Essex and State of New Jersey, citizens of the United States, have invented certain new and useful Improvements in Finger-Exercisers for Students of Type-Writing; and we do hereby declare the following to be a full, clear, and exact description of the invention, such as will enable others skilled in the art to which it appertains to make and use the same, reference being had to the accompanying drawings, and to numerals of reference marked thereon, which form a part of this specification.

The objects of this invention are to avoid subjecting type-writing machines to the wear and tear of usage for mere practicing purposes and the acquirement of speed in fingering the keys, to enable type-writing schools to keep a large number of students at work in practicing the art of fingering the keys of a type-writing machine without incurring the expense of a corresponding large number of type-writing machines, to provide a cheap and simple practicing device and one having a "touch" similar to that of the keys of the type-writing machines on the market, and to secure other advantages and results, some of which may be referred to hereinafter in connection with the description of the working parts.

The invention consists in the improved practicing device for students studying the art of type-writing, and particularly acquiring the speed desirable in practical work of type-writing and in the arrangements and combinations of parts of the same, all substantially as will be hereinafter set forth, and finally embraced in the clauses of the claim.

Referring to the accompanying drawings, in which like numerals of reference indicate corresponding parts in each of the several figures, Figure 1 is a plan of our device, showing the same devoid of its top case or cover, such as we prefer ordinarily to employ. Fig. 2 is a detailed sectional view of one of the finger-keys located in our machine to correspond with those commonly known in type-writing machines as the "shifting-key." Fig. 3 is a plan, and Fig. 4 is a side elevation, showing the construction of the head or finger piece of said key. Fig. 5 is an end view of one of a series of finger-key levers employed in our practicing device; and Fig. 6 is a side view of the same, said levers being shown devoid of finger-pieces. Fig. 7 is a plan of the front end of one of said levers. Fig. 8 is a detail front elevation of a comb-like plate for holding the levers in their proper relative positions. Fig. 9 is a sectional view of the machine, taken on line $x$ of Fig. 1. Fig. 10 is a detail plan showing more clearly a certain stay for holding the finger-key levers in a locked relation, as will be hereinafter described.

In said drawings, 11 indicates a box or case, which may be of any ordinary suitable construction, more or less resembling the frame or case of a type-writing machine, and preferably having at its front an opening to permit access to the finger-keys, the said open end being preferably reduced in height to facilitate the fingering operation. About midway between the front and rear of the said case 11 is stationed a horizontal shaft or bar 12, which serves as a fulcrum for a series of key-levers 13, which are preferably provided each with a weight 14 at its rearward end, adapted to hold the forward end of said lever up to its normal position, as indicated in Fig. 9. Between said fulcrum and said weight we prefer to form a seat 15, Fig. 9, to limit the movement of the lever and hold said lever at the desired limit of movement. Said seat is preferably provided with a cushion of felt or other soft material to prevent the production of noise when the levers fall thereon. We also provide a bearing 16 above said levers and rearward of the fulcrum, whereby the depression of the keys from their normal positions is limited or controlled, the limiting bearing or device being preferably resilient, as will be hereinafter described. From the fulcrum 12 the said levers extend forward through a comb-like structure or guide 17, which serves to hold the said keys separate and apart from one another and in proper position to receive the fingers, the said keys being thus preferably uniformly spaced as in ordinary type-writing machines. The said comb-like structure is struck up from sheet metal and guides the key-levers in their vertical movements, said levers being movable freely in a vertical direction in the slots of the guide 17.

To prevent any movement of the keys, so that the practicing-machine may be transported from place to place without producing noise or effecting a damage to the machine because of the looseness of said levers, we have provided a locking device comprising a bar 18, supported at opposite ends on legs 19, pivoted at their lower ends, as at 20, and adapted to be turned to raise said bar against the under side of the levers to prevent pivotal action. Said bar may thus be turned on its legs by means of a hand-lever 21, Figs. 9 and 10, and a connecting-rod 22 or by other suitable means.

The finger-key levers 13 at their front ends are preferably bent or turned upward, as at 23, and at their upper extremity are turned laterally in one direction, as at 24, and then in the reverse direction, as at 25, in Fig. 5, the second horizontal bending providing a seat on which is secured the finger portions 26. These latter are preferably cup-shaped to receive the lettered plates or disks or disks having identifying-marks common in type-writing-machines, and the bottoms of said cup-shaped parts being cut out to form ears 27, Figs. 3 and 4, adapted to be turned under the seat 25 to fasten the said finger-piece on said seat.

The keys 30, corresponding to the shifting-keys, are of a construction illustrated in Fig. 2, where 31 indicates a vertically-secured slotted barrel containing a spring 32 and a sliding plunger 33, on the top of which is a finger-piece and the bottom a cross-piece 34, bearing upon the top of the spiral spring and sliding in the slots of the barrel. By means of this construction a touch is secured resembling closely the touch of the ordinary shifting-keys. To provide a bar having the action and touch resembling closely the action of the spacing-bar of a type-writing machine, we have arranged the bar 35 on end springs 36, which are preferably ⊃-shaped in side elevation, as in Fig. 9, and permit the bar to be depressed with the slight resistance desirable.

To secure the desired resilience of the bearing-bar 16, against which the several key-levers press upward when depressed at their forward ends, said bar is held by springs 37 37, which are secured to said bearing-bar at or toward the center thereof and incline forward and toward the sides of the box or casing, where said springs are secured upon suitable blocks or fixtures 38. The movable bearing-bar 16 is cushioned or the limiting-bearings thereof are padded to prevent the production of noise in any suitable manner.

Thus constructed the parts may be practiced upon to enable speed to be acquired, and yet the cost of the device is very much less than that of the type-writing machines in the market.

Having thus described the invention, what we claim as new is—

1. The combination with the case, open at its forward end and having a transverse fulcrum therein, of a series of levers arranged on said fulcrum, said levers being free at opposite ends and having identifying finger-keys at their forward ends, their rearward ends overbalancing their forward ends, and a vertically-movable transverse bar resting transversely on said series of levers at points between the fulcrum and weighted free ends thereof, said bar taking the pressure of the lever when the keys thereof are depressed, substantially as set forth.

2. The combination with the case open at its forward end and having a transverse fulcrum therein, of a series of levers arranged on said fulcrum, said levers being free at opposite ends and having identifying finger-keys at their forward ends, their rearward ends overbalancing their forward ends, and means for holding said levers in approximately horizontal positions, a transverse bar limited in its vertical movement in the case, and springs connected with said bar and giving elasticity to the pressure of the keys, said transverse bar being adapted to receive the pressure of the rear or weighted ends of the levers when the keys thereof are depressed, substantially as set forth.

3. The combination with the case open at its forward end and having a transverse fulcrum therein, of a series of levers arranged on said fulcrum, said levers being free at their forward ends, their rearward ends overbalancing their forward ends, and a resilient transverse bar cushioned on the under side and extending over said levers to effect an elastic resistance to the up movement of the rear of each of said levers, substantially as set forth.

4. The combination with the case open at its forward end and having a transverse fulcrum therein, of a series of levers arranged on said fulcrum, said levers being free at their opposite ends and having identifying finger-keys at their forward ends, their rearward ends overbalancing their forward ends, and a bearing-bar placed over the rear ends of said levers, said bar being attached to springs, and said springs fastened to suitable fixtures of the case, substantially as set forth.

5. The improved finger-exerciser herein described, comprising a case open to permit access to the keys and having a spacing-comb rearward of the opening in said case and rearward of said comb having a transverse fulcrum and rearward of said fulcrum having transverse padded limiting-bearings to support the weighted ends of the key-levers and above said supporting-bearings having a transverse, movable bar and springs for holding said bar, and levers arranged on said fulcrum, having their finger-keys at said opening, and at their rearward ends having weights holding said levers normally on their padded supports and adapted, when the keys are struck, to press upward near their weighted ends against the under side of said movable bar, substantially as set forth.

6. In combination with the case, open at its forward end and having a vertically - slotted spacing-comb, and rearward of said comb having a transverse fulcrumal bar and having padded or cushioned limiting-bearings holding the key-levers at or approximately in horizontal positions, the upper bearings having a transverse bar, having springs extending therefrom to a fixture of the case, said bar being upwardly movable against the resilient pressure of the springs and thus adapted to give under pressure, of said key-levers arranged on said fulcrum and free at opposite ends, one end of each lever being provided with an identifying-key and the opposite end having a weight, substantially as set forth.

7. In combination with the case, open at its forward end, and having a vertically-slotted spacing-comb, and rearward of said comb having a transverse fulcrumal bar, and having padded or cushioned limiting-bearings holding said key, levers at or approximately in horizontal positions, the upper bearings being resilient and thus adapted to give under pressure, of said key-levers arranged on said fulcrum, and free at opposite ends, one end of each lever being provided with an identifying-key and the opposite end having a weight, a bar arranged at the front of the collection of identifying-keys, and supported on springs and barrels arranged at opposite sides of said case near the front and containing spiral springs and plungers seated on the last said springs and having finger-pieces at their upper ends, substantially as set forth.

In testimony that we claim the foregoing we have hereunto set our hands this 21st day of January, 1904.

JOHN T. BRATTIN.
WM. G. RESSLAND.

Witnesses:
CHARLES H. PELL,
RUSSELL M. EVERETT.